(12) United States Patent
Kim et al.

(10) Patent No.: US 10,389,523 B2
(45) Date of Patent: Aug. 20, 2019

(54) APPARATUS AND METHOD FOR ENCRYPTING AND DECRYPTING

(71) Applicant: Industry-Academic Cooperation Foundation, Dankook University, Gyeonggi-do (KR)

(72) Inventors: Joonmo Kim, Gyeonggi-do (KR); Younggeun Choi, Gyeonggi-do (KR)

(73) Assignee: INDUSTRY-ACADEMIC COOPERATION FONDATION, DANKOOK UNIVERSITY, Gyeonggi-Do (KR)

( * ) Notice: Subject to any disclaimer, the term of this patent is extended or adjusted under 35 U.S.C. 154(b) by 85 days.

(21) Appl. No.: 15/392,033

(22) Filed: Dec. 28, 2016

(65) Prior Publication Data

US 2017/0250804 A1    Aug. 31, 2017

(30) Foreign Application Priority Data

Jan. 15, 2016    (KR) .................. 10-2016-0005630
Feb. 25, 2016    (KR) .................. 10-2016-022800

(51) Int. Cl.
*G06F 7/58*    (2006.01)
*H04L 9/08*    (2006.01)
(Continued)

(52) U.S. Cl.
CPC ............ *H04L 9/0819* (2013.01); *G06F 7/588* (2013.01); *H04L 9/0869* (2013.01);
(Continued)

(58) Field of Classification Search
CPC ...... H04W 12/04; H04W 12/06; H04W 12/02; H04W 4/80; H04W 12/08; H04L 9/14;
(Continued)

(56) References Cited

U.S. PATENT DOCUMENTS 4,799,061 A * 1/1989 Abraham .............. H04L 9/3271
  235/379
5,623,548 A * 4/1997 Akiyama ................ H04L 9/002
  380/28

(Continued)

OTHER PUBLICATIONS

Extended European Search Report dated May 3, 2017 issued in corresponding European Patent Application No. 16206759.9.

*Primary Examiner* — Theodore C Parsons
*Assistant Examiner* — Howard H. Louie
(74) *Attorney, Agent, or Firm* — Talem IP Law, LLP (57) ABSTRACT

An encryption/decryption device connected to a communications entity includes: a key storage unit configured to store predetermined keys; a processing unit configured to receive a first key among the predetermined keys from the key storage unit and to encrypt data based on the received first key; a data port unit configured to receive data to be encrypted from the communications entity, to transfer the received data to the processing unit, if the data transferred to the processing unit is encrypted by the processing unit based on the first key, to receive the encrypted data from the processing unit, and to transfer the encrypted data received from the processing unit to the communications entity; and a connection unit configured to physically connect the encryption/decryption device with another encryption/decryption device. The predetermined keys are generated when the connection unit is connected to a connection unit included in the another encryption/decryption device.

11 Claims, 6 Drawing Sheets

(51) Int. Cl.
*H04L 9/14* (2006.01)
*H04L 29/06* (2006.01)

(52) U.S. Cl.
CPC .......... *H04L 9/0891* (2013.01); *H04L 9/0894* (2013.01); *H04L 9/14* (2013.01); *H04L 63/0428* (2013.01)

(58) Field of Classification Search
CPC ... H04L 63/061; H04L 9/0861; H04L 9/3247; H04L 9/0894; H04L 9/0819; H04L 9/0869; H04L 63/0428; H04L 9/08; H04L 29/06; H04L 9/0891; G06F 7/588; G06F 7/58
See application file for complete search history.

(56) References Cited

U.S. PATENT DOCUMENTS

| | | | | |
|---|---|---|---|---|
| 6,272,634 | B1* | 8/2001 | Tewfik | G06T 1/0071 375/E7.167 |
| 6,675,153 | B1* | 1/2004 | Cook | G06Q 20/02 705/64 |
| 7,010,689 | B1* | 3/2006 | Matyas, Jr. | H04L 9/08 713/160 |
| 7,159,114 | B1* | 1/2007 | Zajkowski | G06Q 20/3552 380/259 |
| 9,071,424 | B1 | 6/2015 | Bowness et al. | |
| 2002/0131592 | A1* | 9/2002 | Hinnant | H04L 9/0662 380/46 |
| 2002/0184492 | A1* | 12/2002 | Hori | G06F 21/10 713/158 |
| 2004/0260927 | A1* | 12/2004 | Grobman | H04L 9/0891 713/172 |
| 2005/0027997 | A1* | 2/2005 | Ueno | G06F 21/34 713/193 |
| 2005/0031119 | A1 | 2/2005 | Ding | |
| 2005/0129239 | A1* | 6/2005 | Farley | H04B 7/18502 380/270 |
| 2005/0172134 | A1* | 8/2005 | Thornton | G06F 21/10 713/182 |
| 2005/0242987 | A1* | 11/2005 | Umeno | G06F 7/588 342/351 |
| 2006/0168609 | A1* | 7/2006 | Chen | H04H 60/64 725/9 |
| 2007/0076877 | A1 | 4/2007 | Camp, Jr. | |
| 2007/0150737 | A1* | 6/2007 | Parupudi | H04L 9/3263 713/175 |
| 2007/0189521 | A1* | 8/2007 | Ikushima | H04L 9/0662 380/30 |
| 2008/0037785 | A1* | 2/2008 | Gantman | H04L 9/0872 380/259 |
| 2008/0235518 | A1* | 9/2008 | Chen | H04L 9/0897 713/189 |
| 2008/0253563 | A1* | 10/2008 | Chang | G06F 21/10 380/200 |
| 2008/0260148 | A1 | 10/2008 | Lee et al. | |
| 2010/0174919 | A1* | 7/2010 | Ito | G06F 21/554 713/192 |
| 2012/0237024 | A1 | 9/2012 | Liu et al. | |
| 2012/0250863 | A1 | 10/2012 | Bukshpun et al. | |
| 2013/0054934 | A1* | 2/2013 | Mitsugi | G06F 12/1408 711/203 |
| 2013/0067213 | A1 | 3/2013 | Liu | |
| 2013/0067229 | A1* | 3/2013 | German | H04L 63/0815 713/171 |
| 2013/0149959 | A1* | 6/2013 | Beadle | H04B 1/0025 455/39 |
| 2013/0318351 | A1* | 11/2013 | Hirano | H04L 9/3073 713/168 |
| 2014/0223129 | A1* | 8/2014 | McCoy | G06F 21/602 711/164 |
| 2014/0324870 | A1* | 10/2014 | Kami | G06K 9/6215 707/737 |
| 2015/0200773 | A1* | 7/2015 | Sella | H04L 9/0816 380/277 |
| 2015/0326392 | A1* | 11/2015 | Cheng | H04L 9/30 380/28 |
| 2016/0006710 | A1 | 1/2016 | Palme et al. | |
| 2017/0180391 | A1* | 6/2017 | Hinchliffe | G06F 8/65 |

* cited by examiner

APPARATUS AND METHOD FOR ENCRYPTING AND DECRYPTING

TECHNICAL FIELD

The present invention relates to an encryption/decryption device and an encryption/decryption method. More specifically, the present disclosure relates to a technique that reliably eliminates the possibility of hacking in conventional encryption/decryption algorithms such as the RSA algorithm, in such a manner that keys used for encrypting/decrypting data are shared (distributed) by a plurality of encryption/decryption devices only when the encryption/decryption devices are physically connected to one another, and data is encrypted/decrypted by the shared key.

BACKGROUND ART

In a conventional encryption/decryption system, symmetric keys are transmitted by using RSA which is an asymmetric key system, and data is encrypted/decrypted by the symmetric keys thus transmitted. As known in the art, RSA generates a public key and a private key based on the number obtained by multiplying two large prime numbers (p, q), and encrypts data using the generated public key and private key.

In RSA, data is encrypted with a public key and transmitted over a shared communications network. In addition, the public key is disclosed and shared on the Internet. Accordingly, if a private key is found based on the public key, the encrypted data may be hacked. It is known, of course, that finding a private key based on a public key is a very difficult task. However, it is not mathematically impossible to discover a private key based on a public key. Moreover, it often happens that a private key is discovered in a mathematical way. Also, if a malicious attacker such as a hacker has calculated prime numbers (p, q) that can be obtained within an appropriate response time in a certain way, the private key can be discovered much easier.

RELATED ART REFERENCE

Patent Reference (Patent Document 1) Korean Laid-Open Patent Publication No. 2005-0017493 (published on Feb. 22, 2005)

SUMMARY OF THE INVENTION

An object of the present disclosure is to provide a technique that reliably eliminates the possibility of hacking keys used for encrypting and decrypting data during processes of distributing and sharing the keys.

It is another object of the present disclosure to provide a technique that encrypts and transmits/receives data between communication entities, for example, between terminals or between a server and a terminal by employing the above technique.

In addition, another object of the present disclosure is to provide a technique that encrypts/decrypts and transmits/receives data used for financial transactions by employing the above-described technique.

In addition, yet another object of the present disclosure is to provide a technique that applies the above-described technique to an electronic money system to eliminate the possibility of hacking.

It should be noted that objects of the present disclosure are not limited to the above-described objects, and other objects of the present disclosure will be apparent to those skilled in the art from the following descriptions.

In accordance with an aspect of the present disclosure, there is provided an encryption/decryption device connected to a communications entity, the device including: a key storage unit configured to store a plurality of predetermined keys; a processing unit configured to receive a first key among the predetermined keys from the key storage unit and to encrypt data based on the received first key; a data port unit configured to receive data to be encrypted from the communications entity, to transfer the received data to the processing unit, to receive the encrypted data from the processing unit if the data transferred to the processing unit is encrypted by the processing unit based on the first key, and to transfer the encrypted data received from the processing unit to the communications entity; and a connection unit configured to physically connect the encryption/decryption device with another encryption/decryption device, wherein the predetermined keys are generated when the connection unit is connected to another connection unit included in the another encryption/decryption device.

The key storage unit may be connected to the processing unit via a key bus but is not connected to the data port unit via the key bus, and wherein the key bus may be a path through which the first key is transferred to the processing unit.

The predetermined keys stored in the key storage unit included in the encryption/decryption device may have the same values as keys stored in another key storage unit included in the another encryption/decryption device.

The encryption/decryption device may further include a random number generation unit configured to generate random numbers, wherein the predetermined keys may be generated based on the random numbers generated by the random number generation unit.

The processing unit may combine the data with an identifier known to both of the encryption/decryption device and the another encryption/decryption device to generate combined data, and then encrypts the combined data based on the first key, and the data port unit may receive the encrypted, combined data from the processing unit, and transfers the encrypted, combined data to the communications entity.

The processing unit may generate the identifier based on at least two keys among the predetermined keys, wherein said at least two keys may be known to both of the encryption/decryption device and the another encryption/decryption device.

The encryption/decryption device may further include a random number generation unit configured to generate random numbers, wherein the identifier comprises a predetermined number of bits, wherein values of some of the bits are determined based on said at least two keys, and values of the remainder of the bits are determined by random numbers generated by the random number generation unit.

The encryption/decryption device may further include a protection unit configured to recognize that an abnormal action is made to the encryption/decryption device, and to delete the predetermined keys stored in the key storage unit upon recognizing that the abnormal action is made.

The predetermined keys may be modifiable to new keys.

The predetermined keys may be modifiable to the new keys which are generated based on a predetermined value known to the encryption/decryption device and the another encryption/decryption device.

The data port unit, upon receiving the encrypted data from the communications entity, may transfer the encrypted data to the processing unit. The processing unit may receive the predetermined keys from the key storage unit, and decrypts the encrypted data received from the processing unit based on one of the received predetermined keys. The data port unit may receive the decrypted data from the processing unit and transfers it to the communications entity.

The data port unit, upon receiving the encrypted, combined data from the communications entity, may transfer the encrypted, combined data to the processing unit. The processing unit may receive the predetermined keys from the key storage unit, and decrypts the encrypted, combined data received from the processing unit based on one of the received predetermined keys. The data port unit may receive the decrypted, combined data from the processing unit, separates data from the received combined data, and transfers the separated data to the communications entity.

In the encryption/decryption device, if an identifier obtained by decrypting the combined data is identical to the identifier known to both of the encryption/decryption device and the another encryption/decryption device, the processing unit may determine that the key used to decrypt the encrypted, combined data has been used to encrypt the combined data.

In accordance with an aspect of the present disclosure, there is provided an encryption/decryption method using an encryption/decryption device connected to a communications entity, the method including: generating a plurality of predetermined keys when a connection unit included in the encryption/decryption device is physically connected to another connection unit included in another encryption/decryption device; receiving data to be encrypted from the communications entity; encrypting the received data based on a first key among the predetermined keys; and transferring the encrypted data to the communications entity.

The predetermined keys stored in the key storage unit included in the encryption/decryption device may have the same values as keys stored in another key storage unit included in the another encryption/decryption device.

The encryption/decryption method may further include generating random numbers. Said generating the plurality of predetermined keys may include generating the predetermined keys based on the random numbers.

The encrypting may include generating combined data by combining the data with an identifier known to both of the encryption/decryption device and the another encryption/decryption device; and encrypting the combined data based on the first key, wherein said transferring the encrypted data to the communications entity includes transferring the encrypted, combined data to the communications entity.

Said generating combined data may include generating the identifier based on at least two keys among the predetermined keys, which are known to both of the encryption/decryption device and the another encryption/decryption device.

The encryption/decryption method may further include generating random numbers. Said generating the combined data may further include, when the identifier is composed of a predetermined number of bits, generating the identifier by obtaining values of some of the bits based on said at least two keys while obtaining values of the remainder of the bits based on the generated random numbers.

The encryption/decryption method may further include recognizing that an abnormal action is made to the encryption/decryption device, and deleting the predetermined keys stored in the key storage unit upon recognizing that the abnormal action is made.

The encryption/decryption method may further include modifying the predetermined keys to a plurality of new keys.

Said modifying the predetermined keys to the new keys may include generating the new keys based on a predetermined value known to both of the encryption/decryption device and the another encryption/decryption device and modifying the predetermined keys to the new keys.

The encryption/decryption method may further include: receiving encrypted data from the communications entity; upon receiving the predetermined keys, decrypting the received, encrypted data based on one of the received keys; and transferring the decrypted data to the communications entity.

According to an exemplary embodiment of the present disclosure, the possibility that keys used for encrypting/decrypting data are hacked during the process of sharing them by communication entities is completely eliminated. Accordingly, it is possible to achieve a higher level of security when transmitting/receiving data between communication entities. In addition, it is possible to eliminate the loss caused by hacking in financial transactions or electronic money systems.

DETAILED DESCRIPTION OF THE PREFERRED EMBODIMENTS

Advantages and features of the present disclosure and methods to achieve them will become apparent from the descriptions of exemplary embodiments herein below with reference to the accompanying drawings. However, the present disclosure is not limited to exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined only by the claims.

Detailed descriptions of well-known functions and structures incorporated herein will be omitted to avoid obscuring the subject matter of the present disclosure. Further, the following terminologies are defined in consideration of the functions in the present disclosure and may be construed in different ways by the intention of users and operators. Therefore, the terms, such as those defined in commonly used dictionaries, should be interpreted as having a meaning that is consistent with their meaning in the context of the relevant art and/or the present application.

Prior to description, it is assumed that data encrypted in one of encryption/decryption devices according to an exemplary embodiment of the present disclosure can be decrypted in another one of the encryption/decryption devices.

Figure 1:
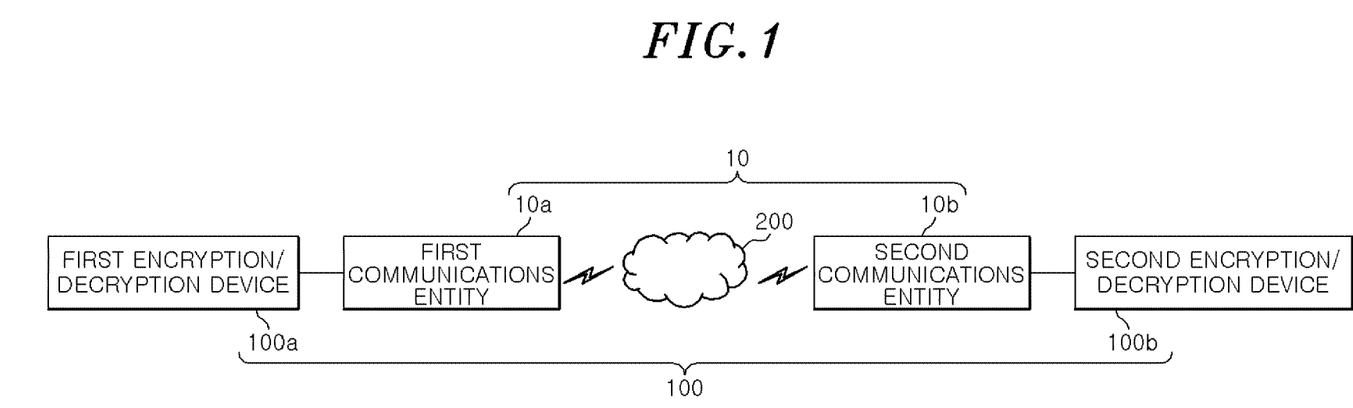
FIG. 1 is a diagram illustrating encryption/decryption devices connected to communications entities according to an exemplary embodiment of the present disclosure.

FIG. 1 is a diagram illustrating encryption/decryption devices connected to communications entities according to an exemplary embodiment of the present disclosure.

Referring to FIG. 1, an encryption/decryption device 100, i.e., a first encryption/decryption device 100a and a second encryption/decryption device 100b are connected to a communications entity 10, i.e., a first communications entity 10a and a second communications entity 10b, respectively. To this end, the communications entity 10 may include a connection unit (not shown) for connection to the encryption/decryption device 100.

The first communications entity 10a and the second communications entity 10b transmit/receive data over a network 200. The data may be encrypted data. The network 200 may be either a wireless communications network such as CDMA, 3G, 4G, LTE-A, Bluetooth, Wi-Fi, NFC or IR network, or a wired communications network such as a LAN.

The first communications entity 10a and the second communications entity 10b may be devices that transmit/receive data to/from each other. The first communications entity 10a and the second communications entity 10b may be those referred to as devices of the Internet of Things, for example, a server of a home network, and various devices performing communication with such a server. In addition, the first communications entity 10a and the second communications entity 10b may be wearable devices that communicate with each other. Further, the first communications entity 10a and the second communications entity 10b may be devices that record and transmit/receive an amount of electronic cash, balance, transaction details, and the like in implementing an electronic cash system. Also, the first communications entity 10a and the second communications entity 10b may be a server installed in a financial institution such as a bank, and a customer's device (PC, smart phone, etc.) who deal with the financial institution in an electronic financial transaction.

The first encryption/decryption device 100a encrypts data to be transmitted from the first communications entity 10a to the second communications entity 10b, such that the first communications entity 10a transmits the encrypted data to the second communications entity 10b. The second communications entity 10b receives the encrypted data from the first communications entity 10a. The second encryption/decryption device 100b decrypts the encrypted data and transfers the decrypted data to the second communications entity 10b. Although it has been described that the first encryption/decryption device 100a encrypts data, the first communications entity 10a transmits the encrypted data, the second communications entity 10b receives the encrypted data, and the second encryption/decryption device 100b decrypts the encrypted data, this is merely illustrative. The operations of the first encryption/decryption device 100a and the first communications entity 10a may be interchanged with those of the second encryption/decryption device 100b and the second communications entity 10b.

Hereinafter, the encryption/decryption devices 100 for encrypting and decrypting data will be described in more detail.

Figure 2:
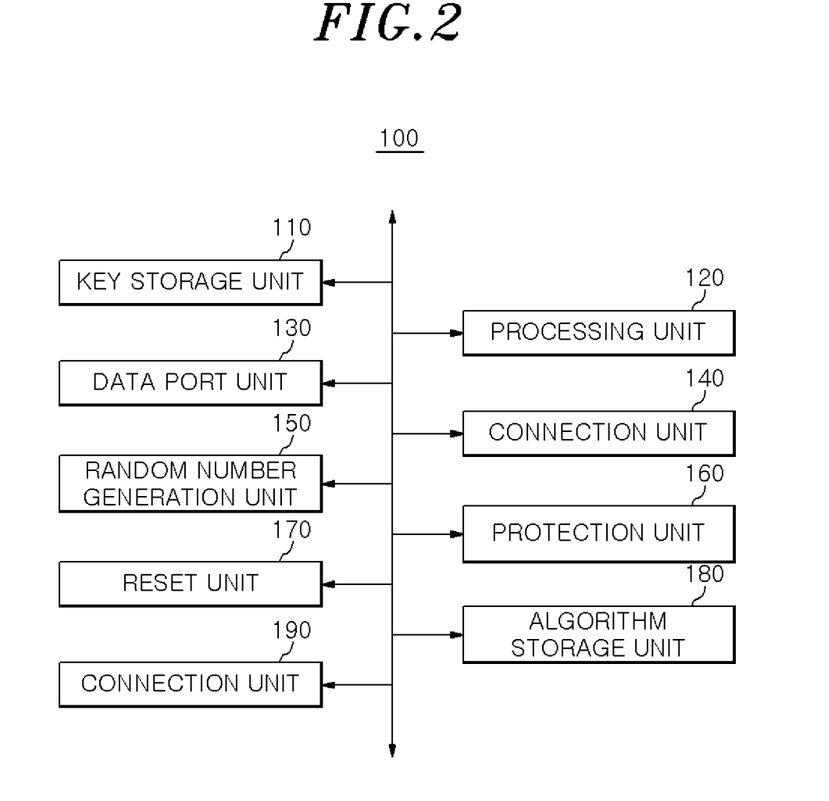
FIG. 2 is a diagram illustrating the configuration of the encryption/decryption device according to an exemplary embodiment of the present disclosure.

FIG. 2 is a diagram illustrating the configuration of the encryption/decryption device according to the exemplary embodiment of the present disclosure.

Referring to FIG. 2, the encryption/decryption device 100 includes a key storage unit 110, a processing unit 120, a data port unit 130, and a connection unit 140. The encryption/decryption device 100 may further include a random number generation unit 150, a protection unit 160, a reset unit 170, an algorithm storage unit 180, and a connection unit 190.

The encryption/decryption device 100 and the above-mentioned elements included therein may be implemented with a memory that stores program instructions to cause the device to perform its functions and a microprocessor that executes such instructions.

Figure 3:
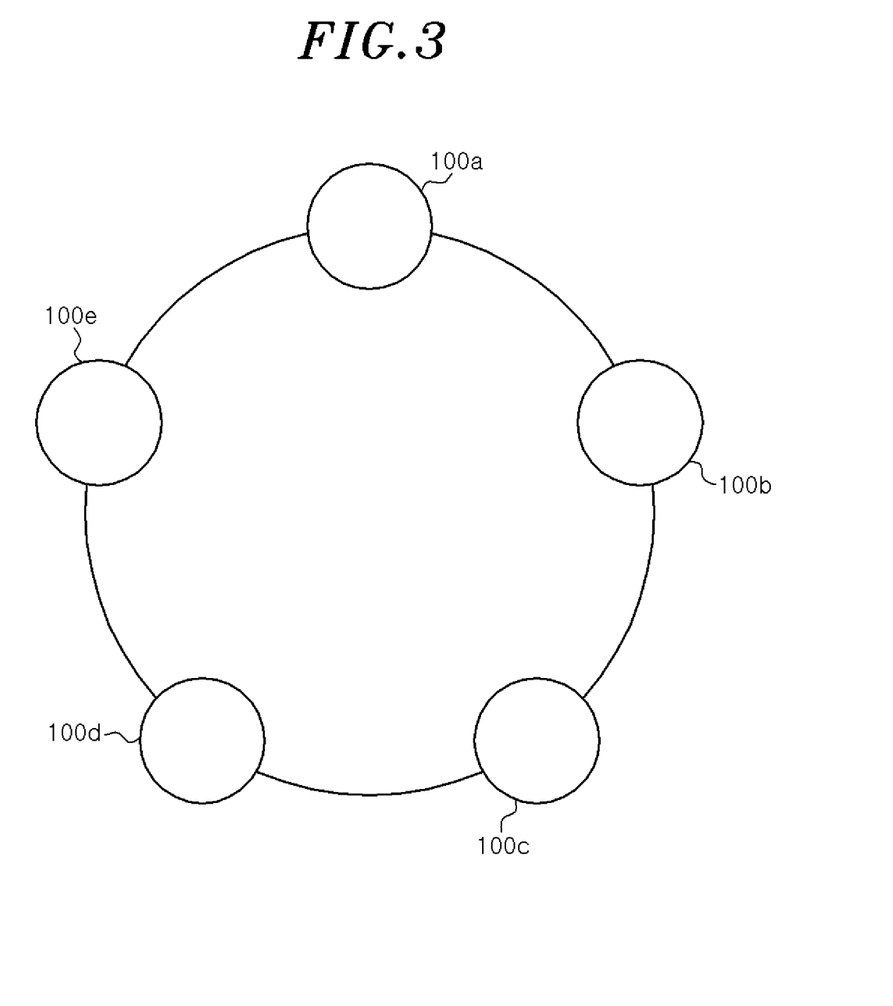
FIG. 3 is a diagram illustrating encryption/decryption devices connected one another according to the exemplary embodiment of the present disclosure.

The connection unit 140 will be described first. The connection unit 140 connects encryption/decryption devices 100 with one another. For example, the connection unit 140 may be implemented as a hardware element, such as a connector. Referring to FIG. 3, the encryption/decryption devices 100 are physically connected to one another through the respective connection units 140 included therein. In doing so, the encryption/decryption devices 100 may be connected to one another in the form of a ring, for example, as shown in FIG. 3. That is, the connection unit 140 is to physically connect the encryption/decryption devices 100 to one another without online.

Referring back to FIG. 2, the key storage unit 110 stores predetermined keys. Each of the keys is used to encrypt data, and may be composed of a plurality of bits.

The key storage unit 110 may generate a plurality of keys based on an arbitrary number of random numbers, for example, 1,000 random numbers generated by the random number generation unit 150. The arbitrary number of the random numbers themselves may be used as the keys. Alternatively, the arbitrary number of the random numbers may be processed by the key storage unit 110 to then be used as the keys.

The reset unit 170 included in the encryption/decryption device 100 generates a seed (a value used for generating random numbers) and provides it to the random number generation unit 150. The seed is also transferred and provided to the random number generation unit 150 included in another encryption/decryption device 100 through the connection unit 140. When the random number generation unit 150 included in the another encryption/decryption device 100 has received the seed, it generates random numbers using the same seed. Therefore, the same random numbers are generated in each of the encryption/decryption devices 100, and accordingly, the encryption/decryption devices 100 generate keys having the same values.

The reset unit 170 will be described in more detail below. The reset unit 170 may include a button and the like through which the user performs input operations. In addition, the reset unit 170 is connected to the random number generation unit 150. When the encryption/decryption devices 100 are connected to one another through their respective connection units 140 and then the reset unit 170 of one of encryption/decryption devices 100 receives a user's input through the button or a touch, the reset unit 170 generates a seed to provide it to the random number generation unit 150. The seed is transmitted and provided to the random number generation unit 150 included in another encryption/decryption device 100.

As described above, the encryption/decryption devices 100 generate and share keys when they are physically connected to one another without online. That is, there is no process of transferring the keys to another encryption/decryption device 100 via any communications network, neither a wired communications nor wireless communications. Therefore, unlike the conventional RSA, it reliably eliminates the possibility that the keys are leaked or hacked in the process of distributing and sharing the keys.

It is to be noted that the above-described process in which the encryption/decryption devices 100 share the keys by using the seed is merely illustrative, and thus the idea of the present disclosure is not limited thereto. For example, the encryption/decryption devices 100 may share keys having the same values in such a manner that one of the encryption/decryption devices 100 generates the keys and then transferring the keys to the rest of the encryption/decryption devices 100 through the connection unit 140, that is, without transferring and providing the seed.

The keys stored in the key storage unit 110 may be updated. The update may be performed periodically or whenever necessary. The encryption/decryption devices 100 may have a predetermined rule for the timing of update, and therefore they can update the keys simultaneously.

In addition, since the update of keys is the generation of new keys, new keys may be generated based on the random numbers generated by the random number generation unit 150 at the time of update. When the keys are updated, the seed transferred to the random number generation unit 150 may be a predetermined value that is known among the encryption/decryption devices 100, for example, the first or last key before the update. That is, the encryption/decryption devices 100 generate keys with the same seed for updating the keys, and use the keys thus generated for updating. Therefore, even if the keys are updated, the encryption/decryption devices 100 can share the keys having the same values.

The processing unit 120 encrypts the data to be transmitted from the communications entity 10 to another communications entity 10. More specifically, a first key is selected from among the keys stored in the key storage unit 110. The first key may be chosen by the key storage unit 110 or the processing unit 120. The processing unit 120 encrypts data to be encrypted based on the first key. Any cryptographic algorithm known in the art may be used for encrypting the data based on the first key. Such a cryptographic algorithm may be stored in the algorithm storage unit 180, which may be a ROM. The data encrypted based on the first key can be decrypted only with the first key.

The processing unit 120 decrypts the encrypted data received by the communications entity 10 from another communications entity 10, and the algorithm for decrypting the encrypted data may also be stored in the algorithm storage unit 10. More specifically, the processing unit 120 decrypts the encrypted data using one of the keys stored in the key storage unit 110. Any known algorithm may be used as the algorithm for decrypting the encrypted data by using the key.

In order for the processing unit 120 to decrypt the encrypted data, it is necessary to know the key used in encrypting the data. Hereinafter, the description thereon will be given in more detail. In the following description, a processing unit for encrypting data is referred to as a first processing unit, and an encryption/decryption device including the first processing unit is referred to as a first encryption/decryption device. Further, a processing unit for decrypting data is referred to as a second processing unit, and an encryption/decryption device including the second processing unit is referred to as a second encryption/decryption device.

The first processing unit generates combined data in which an identifier (or a control block) is combined with data to be encrypted. The identifier is a value known to all of the encryption/decryption devices 100. The first processing unit receives the first key from the key storage unit 110 and encrypts the combined data based on the first key. The encrypted, combined data is sent from the first encryption/decryption device to the second encryption/decryption device.

The second encryption/decryption device receives the encrypted, combined data. The second processing unit decrypts the encrypted, combined data in the following process. However, it is to be noted that the following process is merely an example and the idea of the present disclosure is not limited thereto. Initially, the second processing unit receives keys one by one from the key storage unit 110. The second processing unit attempts to decrypt the encrypted, combined data based on each of the received keys. The second processing unit separates the identifier from the decrypted data. The second processing unit determines whether the decrypted identifier is a value known to the second encryption/decryption device. If the decrypted identifier is a value known to the second encryption/decryption device, it is determined that the received key has been used for the encryption, and the rest of the decrypted and combined data is treated as decrypted data. However, if the value is not known to the second encryption/decryption device, the second processing unit receives a new key from the key storage unit 110 and repeats the decryption process until a value known to the second encryption/decryption device is obtained.

As can be seen from the foregoing description, in order for a hacker to decrypt the encrypted, combined data, the hacker should know all of the keys, as well as the identifier. However, since the keys are shared (distributed) when the encryption/decryption devices 100 are physically connected to one another without online, there is no chance of leakage. In addition, the program for forming the identifier is installed in a ROM of the encryption/decryption device 100 during the initial production process, and thus the hacker cannot discover it. Therefore, by using the encryption/decryption device according to the exemplary embodiment of the present disclosure, the possibility of hacking can be fundamentally eliminated.

Figure 5A:
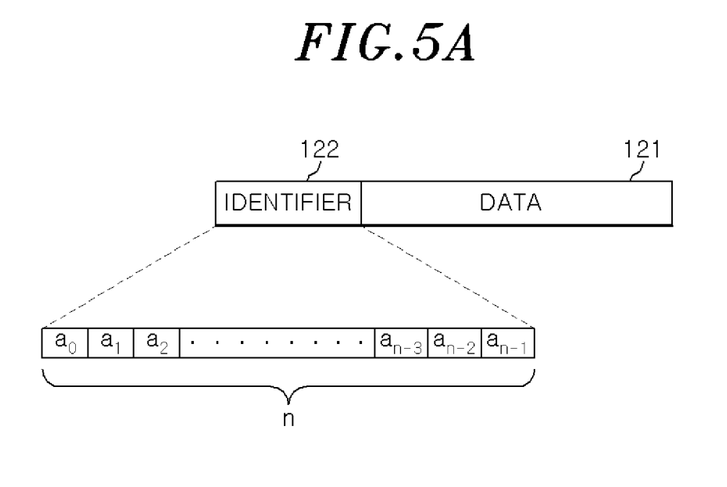
FIGS. 5A and 5B are diagrams conceptually illustrating an identifier according to the exemplary embodiment of the present disclosure.

Hereinafter, the identifier will be described in more detail. As described above, the identifier is a value known to all of the encryption/decryption devices 100. FIG. 5A is a diagram conceptually illustrating combined data in which an identifier 122 and data 121 are combined. Referring to FIG. 5A, the identifier 122 may be composed of a predetermined number of bits, e.g., "n" bits.

Figure 5B:
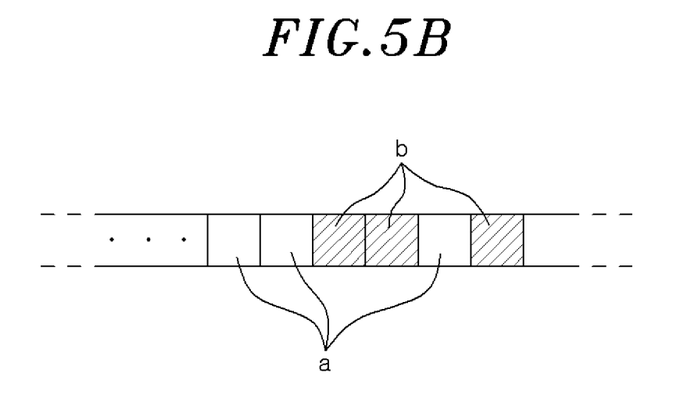

These "n" bits may be filled with the values according to a preset rule that is known to the encryption/decryption devices 100. FIG. 5B is a diagram conceptually illustrating that "n" bits of an identifier are filled with the values according to the preset rule that is known to the encryption/decryption devices 100. Hereinafter, the rule will be described in more detail.

By using at least two predetermined keys which are known to the encryption/decryption devices 100, certain values are assigned to particular positions of the "n" bits. For example, let us assume that 50 keys, that is, the first key to the fiftieth key are known to the encryption/decryption devices 100. In addition, let us assume that a value obtained by performing a modular operation on the first key with "n" is the first value, and a value obtained by performing the modular operation on the second key with 2 is the second value, the second value is assigned to one of the "n" bits that is at the position indicated by the first value. Then, let us assume that a value obtained by performing the modular operation on the third key with n is the third value and a value obtained by performing the modular operation on the fourth key with 2 is the fourth value, the fourth value is assigned to one of the "n" bits that is at the position the bit indicated by the third value. In this manner, values are assigned to particular positions of the "n" bits, respectively, by using the fifty keys. If it is necessary to assign another value again to a position to which a value has already been assigned, the value obtained lately is assigned to the position. Thereafter, there may be bits among the n bits that are not assigned any values. Bits generated by the random number generation unit 150 are assigned to the bits to which no value is assigned. FIG. 5B is a diagram conceptually illustrating the generation of an identifier by the above-described process. Referring to FIG. 5B, the bits assigned values obtained by using at least two keys among the "n" bits are represented by "b", and bits assigned random numbers generated by the random number generation unit 150 are represented by "a".

The identifier generated by the first processing unit in the above manner may also be derived by the second processing unit using the same algorithm. That is, the second encryption/decryption device generates an identifier using the same algorithm as the first encryption/decryption device. Thereafter, upon receiving the encrypted, combined data from the first encryption/decryption device, the second processing unit attempts to decrypt the first "n" bits (identifier-part) of the encrypted, combined data with the predetermined keys one by one. For each result of the decryption, the second encryption/decryption device compares the bits only at the positions "b" of the decrypted identifier where the values are assigned, with the identifier generated by the second encryption/decryption device itself. If the values at the positions "b" are identical for both of the identifiers, it is determined that the key has been used for the encryption.

When the identifier thus generated is used, a hacker can hack the data only if she/he knows all of the keys, at least two keys used to generate the identifier, and the algorithm used to generate the identifier. However, as described above, since the keys are shared by the encryption/decryption devices 100 through hardware connection without online, there is no chance of leakage. In addition, the program for forming the identifier is installed in a ROM of the encryption/decryption device 100 during the initial production process, and thus the hacker cannot discover it. Therefore, by using the encryption/decryption device according to the exemplary embodiment of the present disclosure, the possibility of hacking can be fundamentally eliminated.

Referring back to FIG. 2, the data port unit 130 receives data to be encrypted from the communications entity to transfer it to the processing unit 120. When the processing unit 120 encrypts the data, the data port unit 130 transfers the encrypted data to the communications entity 10.

In addition, the data port unit 130 receives the encrypted data from the communications entity 10 and transfers the encrypted data to the processing unit 120. In addition, when the processing unit 120 decrypts the encrypted data, the data port unit 130 transfers the decrypted data to the communications entity 10.

Figure 4:
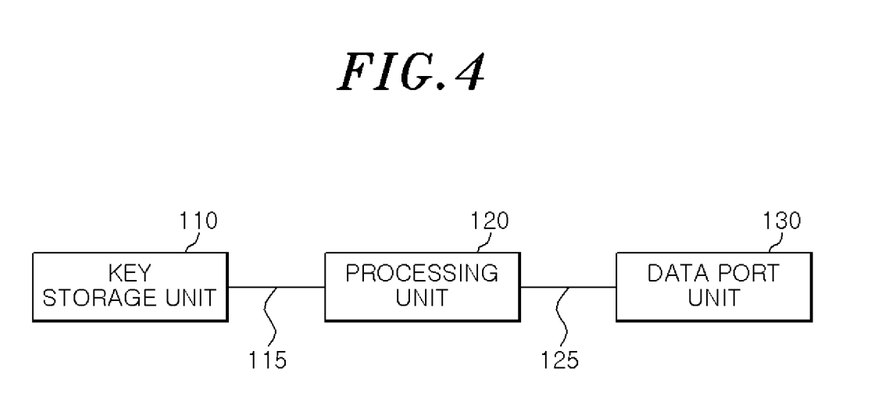
FIG. 4 is a diagram conceptually illustrating a key storage unit, a processing unit and a data port unit connected to one another in the encryption/decryption device according to the exemplary embodiment of the present disclosure.

Referring to FIG. 4, the data port unit 130 is connected to the processing unit 120 via a data bus 125. The data bus 125 is a path through which data is transmitted and received. The key storage unit 110 is connected to the processing unit 120 via a key bus 115. The key bus 115 is a path through which a key stored in the key storage unit 110 is transferred to the processing unit 120.

Although the key storage unit 110 is connected to the processing unit 120 via the key bus 115, it is not directly connected to the data port unit 130. Accordingly, it is impossible to directly access the key storage unit 110 via the data port unit 130 from the outside, and in turn, it is impossible to access the keys stored in the key storage unit 110 from the outside.

The protection unit 160 recognizes that an action defined as abnormal is made to the encryption/decryption devices 100. When such an action is recognized, the protection unit 160 deletes the keys stored in the storage unit 110. The actions defined as abnormal may include, but is not limited to, an attempt to electronically copy keys stored in the key storage unit 110, an attempt to detect vibration or heat, etc.

The connection unit 190 connects the encryption/decryption device 100 with the communications entity 10. The connection unit 190 may be, but is not limited to, a hardware element such as a connector, or a module for wireless communications such as Bluetooth, NFC, WiFi, etc.

Figure 6:
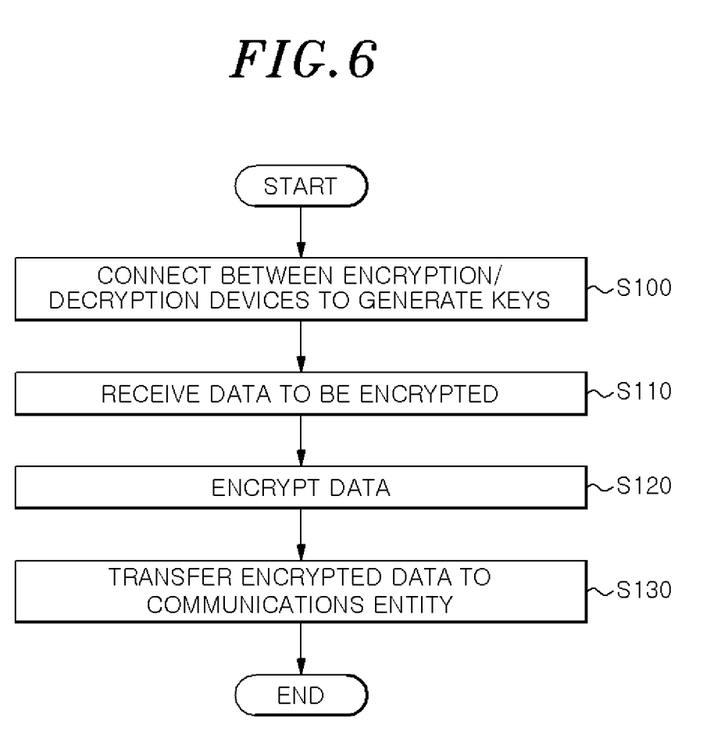
FIG. 6 is a flowchart for illustrating a procedure of an encryption/decryption method according to the exemplary embodiment of the present disclosure.

FIG. 6 is a flowchart for illustrating a procedure of an encryption/decryption method according to an exemplary embodiment of the present disclosure, which may be performed by the encryption/decryption device 100 described above. In addition, the encryption/decryption method to be described below may not include at least one of the steps to be described below or may further include an additional step. Further, the method may be performed in different orders from the order described below.

Referring to FIG. 6, the method includes: generating predetermined keys when a connection unit included in a encryption/decryption device is physically connected to another connection unit included in another encryption/decryption device (step S100); receiving data to be encrypted from a communications entity (step S110); encrypting the received data based on a first key among the keys (step S120); and transferring the encrypted data to the communications entity (step S130).

The encryption/decryption method is performed by the encryption/decryption device 100, and the function of each of the steps of the encryption/decryption method has already been described in detail with respect to the encryption/decryption device 100; and, therefore, detailed description thereof will be omitted.

As described above, according to an exemplary embodiment of the present disclosure, the possibility that keys used for encrypting/decrypting data are hacked during the process of sharing them by communication entities is fundamentally eliminated. Accordingly, it is possible to achieve a higher level of security when transmitting/receiving data between communication entities. In addition, it is possible to completely eliminate the loss caused by hacking in financial transactions or electronic cash systems.

Combinations of blocks in the accompanying drawings and steps in a flow chart may be performed according to computer program instructions. These computer program instructions can be installed in general-purpose computers, special-purpose computers or other processors of programmable data processing equipment. Therefore, the instructions executed by the processor of the computers or other programmable data processing device create means for performing functions described in the blocks of the block diagrams or in the steps of the flowchart. These computer program instructions can be stored in computer-usable or computer-readable memories which can assist in the computers or other processors of programmable data processing equipment to implement particular functions in particular manners. Therefore, the instructions stored in the computer-usable or computer-readable memories may be used to produce articles containing instruction means for performing the functions described in the blocks of the block diagrams or in the steps of the flowchart. The computer program instructions may also be installed in computers or other programmable data processing device. Therefore, a sequence of operation steps may be performed on the computers or other programmable data processing device to produce computer-executable processes. The instructions operating the computers or other programmable data processing device may provide steps for performing the functions described in the blocks of the block diagrams or in the steps of the flowchart.

In addition, the blocks or the steps may represent portions of modules, segments or codes including one or more executable instructions for executing a specified logical function(s). In addition, it should be noted that, in some alternative embodiments, the functions described in association with blocks or steps may be performed out of a specified sequence. For example, two consecutive blocks or steps may be performed substantially simultaneously or may be performed in the reverse order depending on the function to be performed.

While particular embodiments of the present disclosure have been disclosed, it is to be understood that various different modifications and combinations are possible without departing from the gist of the present disclosure by those skilled in the art. Accordingly, the exemplary embodiments described herein are merely illustrative and are not intended to limit the scope of the present disclosure. The technical idea of the present disclosure is not limited by the exemplary embodiments. The scope of protection sought by the present disclosure is defined by the appended claims and all equivalents thereof are construed to be within the true scope of the present disclosure.

What is claimed is:

1. An encryption/decryption device connected to a communications entity, the device comprising:
   a connection unit;
   a data port unit configured to communicate with the communications entity;
   a key storage unit configured to generate a plurality of predetermined keys when the encryption/decryption device is connected to another encryption/decryption device through the connection unit and store the plurality of predetermined keys, the plurality of predetermined keys being shared with the another encryption/decryption device;
   a random number generation unit configured to generate random numbers; and
   a processing unit configured to:
      receive data from the communications entity through the data port unit,
      generate an identifier including a predetermined number of bits,
      combine the received data with the identifier, and
      encrypt the combined data using a first key selected from among the plurality of predetermined keys,
   wherein the encrypted, combined data is transmitted to the communications entity through the data port unit,
   wherein values of some of the bits of the identifier are determined based on at least two different keys among the predetermined keys and values of a remainder of the predetermined number of bits of the identifier are determined based on the random numbers generated by the random number generation unit,
   wherein the identifier indicates the first key is used for encrypting data among the predetermined keys.

2. The encryption/decryption device according to claim 1, wherein the key storage unit is connected to the processing unit via a key bus but is not connected to the data port unit via the key bus, and wherein the key bus is a path through which the first key is transferred to the processing unit.

3. The encryption/decryption device according to claim 1, wherein the predetermined keys stored in the key storage unit included in the encryption/decryption device have the same values as keys stored in another key storage unit included in the another encryption/decryption device.

4. The encryption/decryption device according to claim 1, further comprising:
   a protection unit configured to recognize that an abnormal action is made to the encryption/decryption device, and to delete the predetermined keys stored in the key storage unit upon recognizing that the abnormal action is made.

5. The encryption/decryption device according to claim 1, wherein the predetermined keys are modifiable to new keys.

6. The encryption/decryption device according to claim 5, wherein, the predetermined keys are modifiable to the new keys which are generated based on a predetermined value known to the encryption/decryption device and the another encryption/decryption device.

7. An encryption/decryption method using an encryption/decryption device connected to a communications entity, the method comprising:
   generating a plurality of predetermined keys when the encryption/decryption device is physically connected to another encryption/decryption device through a connection unit included in the encryption/decryption device;
   storing the plurality of predetermined keys, the plurality of predetermined keys being shared with the another encryption/decryption device;
   generating random numbers;
   receiving data from the communications entity;
   generating an identifier including a predetermined number of bits;
   combining the received data with the identifier;
   encrypting the combined data using a first key among the plurality of predetermined keys; and
   transferring the encrypted, combined data to the communications entity,
   wherein values of some of the bits of the identifier are determined based on at least two different keys among the predetermined keys and values of a remainder of the predetermined number of bits of the identifier are determined based on the generated random numbers,
   wherein the identifier indicates the first key is used for encrypting data among the predetermined keys.

8. The encryption/decryption method according to claim 7, wherein the predetermined keys stored in the key storage unit included in the encryption/decryption device have the same values as keys stored in another key storage unit included in the another encryption/decryption device.

9. The encryption/decryption method according to claim 7, further comprising:
   recognizing that an abnormal action is made to the encryption/decryption device; and deleting the predetermined keys stored in the key storage unit upon recognizing that the abnormal action is made.

10. The encryption/decryption method according to claim 7, further comprising:
modifying the predetermined keys to a plurality of new keys.

11. The encryption/decryption method according to claim 10, wherein said modifying the predetermined keys to the new keys comprises generating the new keys based on a predetermined value known to both of the encryption/decryption device and the another encryption/decryption device and modifying the predetermined keys to the new keys.

\* \* \* \* \*